May 3, 1966 W. A. PLESKO ET AL 3,249,264
MATERIAL CONTROL HOPPER SPREADER
Filed Nov. 10, 1964 3 Sheets-Sheet 1
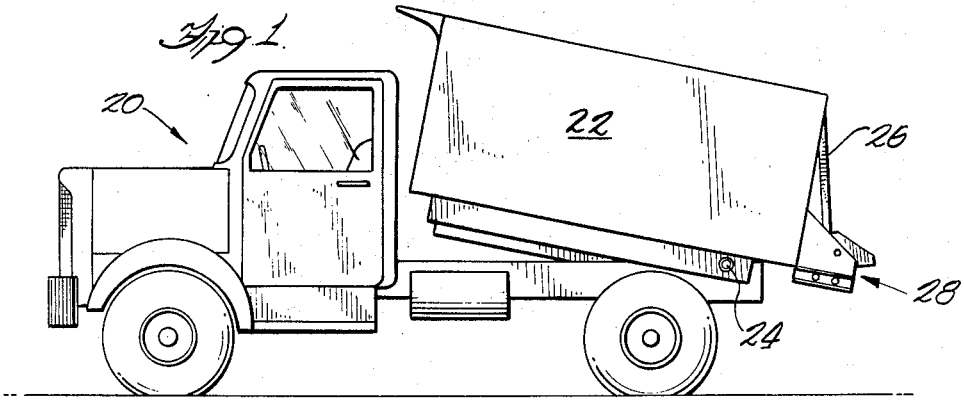
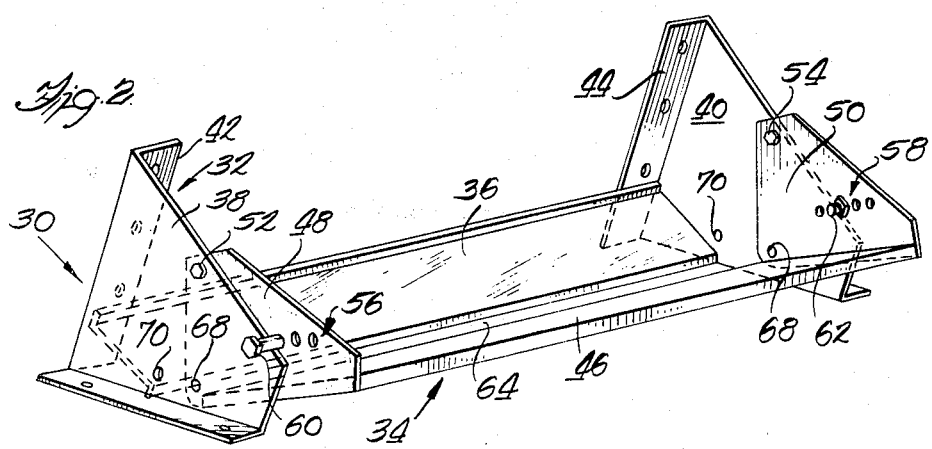
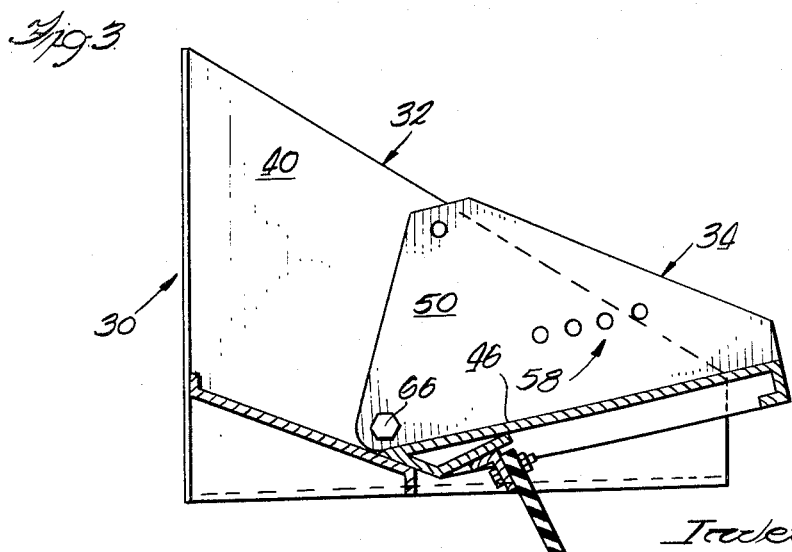
Inventors
William A. Plesko
Julius B. Szilagy
Attorney

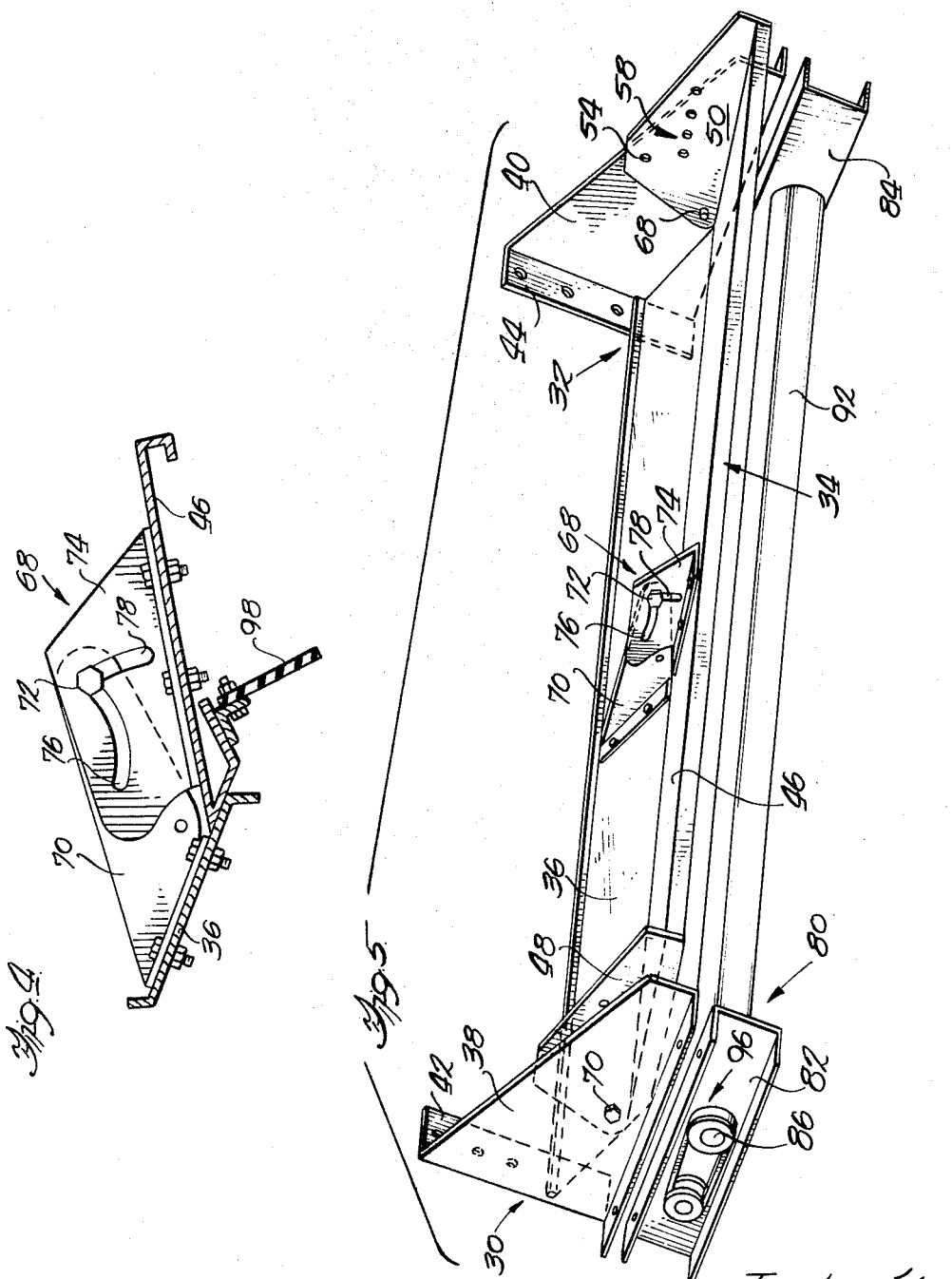

CO-INVENTORS:
William A. Plesko
Julius B. Silogy

United States Patent Office 3,249,264
Patented May 3, 1966

3,249,264
MATERIAL CONTROL HOPPER SPREADER
William A. Plesko, 4748 Madison St., Gary, Ind., and Julius B. Silogy, 4339 Hickory St., Hammond, Ind.
Filed Nov. 10, 1964, Ser. No. 410,130
6 Claims. (Cl. 222—317)

This invention relates to a material control hopper and material spreader, which are interdependent on each other and which are used for spreading various types of road materials.

In previously designed spreaders it has been necessary to remove the spreader equipment before the truck could be used for other types of truck work. This operation caused considerable time loss and delay. However, our device, which is a permanent attachment to a dump truck box, enables the truck to be used either as a material spreader or as a dump truck.

Another advantage of this invention is the more precise adjustment for the tailgating of material. Our new method is far superior to the old method of adjusting by means of the tailgate chain, which allows the opening for the material to be increased or decreased by only a full chain link. Tailgating in our invention is done by means of an adjustment of a hingeable material control hopper. This adjustment allows a finer and more variable control of an opening for the dispersion of various materials. This fine adjustment also retains all large foreign matter relative to the width of the hopper longitudinal opening. All foreign matter can be cleared by pulling open the inner unit of the material control hopper, which then returns to its original adjusted position upon release.

A hand shovel bin provides a new means for facilitating the hand shoveling of material off the rear of a dump truck box. The shoveling of material is done from a bin rather than off of the tailgate of the truck. When locked in a closed position, the material control hopper's inner unit is positioned at an upward angle to the flat surface of the dump box floor. The object of this angle is to form a shovel bin that retains the material at various angular positions of the dump box; however, when the dump truck is in full tilt position all material is expelled. The advantage of this shovel bin is that material can be shoveled at hip level and spillage from the sides and back of the tailgate is eliminated. In the old method all shoveling is done off the tailgate of a dump truck at shoulder level or higher, and spillage over the sides and back of the tailgate is excessive. Still another advantage of our shovel bin is that the truck can be loaded to full capacity because the tailgate is in its vertical position when the hand shovel bin is in use. The old method of shoveling off the tailgate in its horizontal position necessitated the carrying of only a ⅔ of a material load.

Another advantage of this invention is that the material control hopper's inner unit can be converted into a hingeable dump chute merely by changing the hinging point thereof. This new hinging point also allows the dump chute to hinge upward. The advantage of this hingeable dump chute is, that as the dump box is being raised to its dumping position any build up of material under the chute will not damage or distort this hingeable chute.

A sliding plate with two intersecting arcuate slots and a stationary plate are hinged together to support the rear wall of the inner unit of the material control hopper. This support automatically adjusts to all operations of the material control hopper.

Our spreading invention, comprises two interdependent units, a material control hopper and a material spreader which is attached beneath this hopper. This complete unit can be used for the spreading of various types of road materials and for the controlled dispersion of material onto icy pavements. While the material spreader is in use, the truck can move in a forward or backward direction without altering any spreader adjustments and without interfering with the single rotating direction of the roller.

In our spreading operation the adjustment of the material control hopper inner unit determines the width of the hopper longitudinal opening for the dispersion of material into the spreader unit. Relative to the size of this opening, large foreign matter is retained in the material control hopper while smaller foreign matter flows with the material onto a rotating roller. The retaining of large foreign matter in the material control hopper is advantageous because it reduces excessive wear on the spreader, assures the constant flow of material, and eliminates the danger of large foreign objects being dropped onto the roadway.

The thickness of the spread of material is controlled by a rubber strip attached to and beneath the adjustable material control hopper inner unit. The opening between the rubber strip and the roller automatically adjusts itself in relation to the adjustment of the width of the hopper longitudinal opening. The flexibility of this rubber strip enables the small foreign matter in the spreader to pass with the material onto the roadway. However, when the roller is not in motion this rubber strip eliminates the spillage of material.

All foreign matter retained in the material control hopper and all material retained in the spreader can be cleared by pulling open the material control hopper's inner unit, which then returns to its original adjusted position upon release.

FIGURE 1 is a side elevation view of a dump truck on which is mounted a material control hopper and spreader;

FIGURE 2 is a perspective view of a material control hopper shown in an open position;

FIGURE 3 is a side elevation sectional view of a material control hopper shown in the closed position;

FIGURE 4 is a side elevation sectional view of a material control hopper showing the center support thereof;

FIGURE 5 is a diagrammatic perspective view of a material control hopper and spreader;

Figure 6:
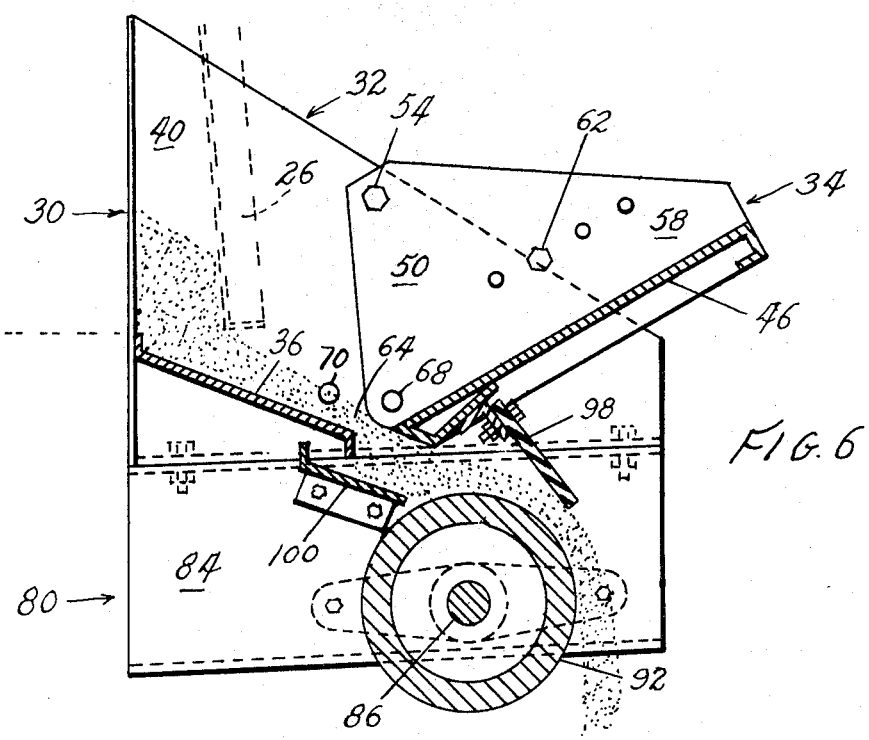
FIGURE 6 is a side elevation view of a material control hopper and spreader shown in the operative position.
Figure 7:
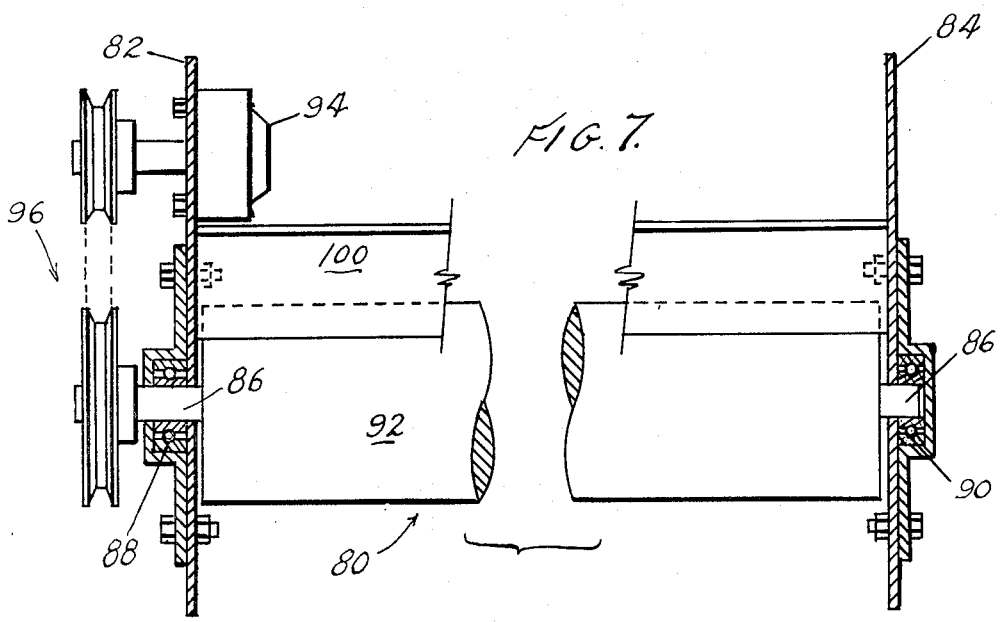
FIGURE 7 is a top plan partial sectional view of the material spreader.

Referring now to FIGURE 1, there is shown a dump truck 20 having a dump box 22 which may be positioned at various angles by rotation about pivotal mounting 24. A tailgate 26 is pivotally secured at its upper end to the upper portion of the side walls of dump box 22. A material control hopper and spreader 28 is attached to the rear portion of dump box 22 below tailgate 26.

The material control hopper and spreader includes a hopper 30 shown in FIGURES 2 and 3. The hopper 30 comprises an outer unit 32 and an inner unit 34. The outer unit 32 includes an inclined front wall 36 to which is attached at its outer ends side walls 38 and 40. Flanges 42 and 44 on side walls 38 and 40 respectively may be fixedly secured to the dump box 22 of truck 20 by bolts or other securing means.

The inner unit 34 includes a rear inclined wall 46 to which is attached at its outer ends side walls 48 and 50. The inner unit 34 is positioned within outer unit 32 and is pivotally mounted thereto by pivot pins or bolts 52 and 54 inserted through holes in the upper portions of the side walls of the inner and outer units. A plurality or series of holes 56 and 58 are formed in the inner unit side walls 48 and 50 through which stop elements or bolts 60 and 62 may be inserted.

It will be seen that when the inner unit 34 is pivotally mounted to the outer unit 32 through pivot pins 52 and 54 the inner unit 34 may be rotated so that a longitudinal opening 64 will be formed between the outer unit inclined front wall 36 and the inner unit inclined rear wall 46. Material which flows from the dump box 22 into the hopper 30 will thereby be dispersed through the longitudinal opening 64. The width of this longitudinal opening may be controlled by inserting bolts 60 and 62 through any one of the series of holes 56 and 58 so as to fix the position of inner unit 34 with respect to outer unit 32.

In FIGURE 3 the hopper 30 is shown wherein pivot pins 66, one of which is shown, is inserted through the inner unit side wall holes 68 and the outer unit side wall holes 70. The pivot pins 52 and 54 may be removed from the holes in the upper portions of the inner and outer unit side walls so that the inner unit 34 is free to rotate with respect to the outer unit 32 about pivot pins 66.

In operation, the hopper 30 as shown in the configuration of FIGURE 3 may be used as a closed hopper into which material may flow from dump box 22 and be retained therein by inserting pivot pins 52 and 54 as well as the pins 66. This material may then be manually shoveled or spread from this hopper which is at a convenient height for such manual labor. The angular position of the rear inclined wall 46 relative to the floor of the dump box 22, when the hopper 30 is in the closed position, will normally prevent material from flowing over the rear edge of inner unit inclined rear wall 46. In the event that material is desired to be dumped from the end of the hopper such as into a pile or bin or the like, the pivot pins 52 and 54 are removed and the dump box 22 rotated to a full tilt position wherein the material will flow over the rearward edge of inclined rear wall 46. When such material is being dumped, should the pile of material or the walls of the material bin extend higher than the rear edge of rear inclined wall 46, the inner unit 34 will readily pivot about pins 66 so as to prevent damage thereto.

In FIGURES 4 and 5 there is shown a center support 68 to prevent lateral bending of the inclined rear wall 46 of the inner unit. Center support 68 comprises an outer unit vertical plate 70 in which is fixedly secured at the rearward upper end thereof a support pin or bolt 72. The plate 70 is mounted on the outer unit inclined front wall 36. An inner unit vertical plate 74 is mounted on the inclined rear wall 46 and has arcuate slots 76 and 78 formed therein. The radius of arcuate slot 76 is such that when the inner unit 34 is mounted so as to pivot about pins 52 and 54 the vertical plate 74 may freely slide relative to vertical plate 70 while pin 72 moves along the slot 76 so as to vertically support inclined rear wall 46. When the inner unit 34 is adapted to pivot with respect to the outer unit 32 about pivot pin 66, the vertical plate 74 may freely slide relative to plate 70 through arcuate slot 78.

In FIGURES 5 through 6 the hopper 30 is shown in operative combination with a material spreader 80. The spreader 80 comprises side walls 82 and 84 which are fixedly mounted to the side walls 38 and 40 of the hopper outer unit 32. Journalled in walls 82 and 84 is a shaft 86 supported by bearings 88 and 90 in walls 82 and 84 respectively. A roller 92 is mounted on shaft 86 and as seen in FIGURE 6 is positioned beneath the longitudinal opening 64 formed in hopper 30. Means 94 for rotating the roller 92 is secured on side wall 82 of the spreader 80 and through belt and pulley system 96 rotates roller 92 in one direction regardless of the movement of truck 20.

As seen in FIGURES 3, 4 and 6, the hopper inner unit inclined rear wall 46 has a resilient member 98 fixedly secured to the undersurface thereof. As shown in FIGURE 6, a second inclined front wall 100 is mounted between the spreader side walls 82 and 84 and is positioned below hopper outer unit inclined front wall 36 and having its rearward edge proximate the periphery of roller 92.

The operation of the material control hopper and spreader in combination, is as follows. The material in dump box 22 flows therefrom past tailgate 26 and into hopper 30. The material moves down the inclined front wall 36 and through positioning of inner unit 34 by the insertion of pins 60 and 62 in one of the series of holes 56 and 58 will flow through a longitudinal opening 64 onto the second inclined front wall 100. The rotating roller 92 will carry the material about its periphery and the resilient member 98 will guide the material so as to provide an even dispersion of material from the material control hopper and spreader. It will be appreciated that the position of resilient member 98 on the undersurface of the inner unit rear wall 46 adjusts the opening between the roller 92 and the resilient member 98 in accordance with the width of longitudinal opening 64. It will also be noted that should large pieces of foreign material become lodged in longitudinal opening 64 the inner unit 34 may be manually pivoted so as to allow such foreign material to pass through the spreader 80.

It will be apparent from the preceding discussion that the material control hopper and spreader is adapted for use in several modes of operation. When it is desired to hand shovel the material from the hopper, the hopper may be closed so as to form a trough which will retain the material at a height convenient for manual shoveling. If it is desired to dump material from the rearward edge of the truck, the inner unit of the hopper may be pivotally mounted so that a force directed from below the inner unit rear wall will not damage the inner unit. When it is desired to spread material, a change in the pivot pins between the inner and outer unit of the hopper provides a longitudinal opening from which material can flow over a rotating roller and thereby be evenly dispersed over the roadway or like surface. It will also be seen that the material control hopper and spreader need not be removed from the dump truck when one of the above-described modes of operation is employed as in prior art devices.

While a preferred embodiment of the present invention has been shown and described, it will be obvious to those skilled in the art that changes and modifications may be made without departing from the invention in its broader aspects. Accordingly it is the aim of the appended claims to cover all such changes and modifications as fall within the true spirit and scope of the invention.

We claim:

1. A material control hopper for mounting below the tailgate of a dump truck box said material control hopper, comprising an outer unit including a front inclined wall and two side walls connected to the outer ends of said inclined front wall, an inner unit including an inclined rear wall and two side walls connected to the outer ends of said inclined rear wall, the inner unit positioned within and releasably pivotally connected to said outer unit at the top portion of said inner unit side walls and said outer unit side walls to permit pivoting of said inner unit, whereby the width of a longitudinal opening between the inner and outer units may be adjusted.

2. A material control hopper of the character described in claim 1 further including means for adjusting the width of the longitudinal opening between said inner and outer units by pegs inserted in any of a series of adjusting holes in said inner unit side walls, said pegs protruding and striking the edges of said side walls of said outer unit in order to retain said inner unit at a selected position.

3. A material control hopper of the character described in claim 1, wherein the lower portion of each of said inner unit side walls is releasably pivotally mounted to the respective lower portion of said outer unit side walls by hinge pins inserted through holes in the lower portions of said inner and outer unit side walls so as to form a pocket that retains material at angular positions of the dump truck box less than full tilt and allowing material to be expelled from the dump truck box when the box is at full tilt.

4. A material control hopper of the character described in claim 1 further including means for supporting the center portion of said inner unit inclined rear wall comprising a substantially vertical first plate fixedly mounted on said inclined front wall, a substantially vertical second plate fixedly mounted on said inclined rear wall, said second plate having arcuate slots therein and said first plate having a pin fixedly mounted thereon and extending through said second plate arcuate slots.

5. A material control hopper and spreader for mounting below the tailgate of a dump truck box comprising a hopper including an outer unit having an inclined front wall and side walls mounted on the opposite ends of said inclined front wall, an inner unit having an inclined rear wall and side walls mounted on the opposite ends of said inclined rear wall, said inner unit positioned within and pivotally connected to said outer unit at the upper portions of said inner and outer unit side walls, and a spreader mounted beneath said hopper including side walls depending from said hopper outer unit side walls, a shaft journalled in said spreader side walls, a roller mounted on said shaft and positioned beneath the junction of said hopper outer unit inclined front wall and said hopper unit inclined rear wall, and means for rotating said roller.

6. The material control hopper and spreader of claim 5 wherein said means for rotating said roller is independent of the motion of the vehicle on which said material control hopper and spreader is mounted and wherein said hopper further includes a resilient member depending from said hopper inner unit inclined rear wall proximate said roller.

References Cited by the Examiner
UNITED STATES PATENTS 3,010,612  11/1961  Steinle _____ 222—314
3,086,684  4/1963  Flaherty _____ 222—312

LOUIS J. DEMBO, *Primary Examiner.*

HADD S. LANE, *Examiner.*